Feb. 19, 1952

W. A. DENNIS 2,586,622

TRACTOR-OPERATED SAW

Filed Jan. 18, 1949

Inventor
WILLIAM A. DENNIS

By Ralph B. Stewart

ATTORNEY

Patented Feb. 19, 1952

2,586,622

UNITED STATES PATENT OFFICE 2,586,622

TRACTOR-OPERATED SAW

William Albert Dennis, Cameron, S. C.

Application January 18, 1949, Serial No. 71,495

8 Claims. (Cl. 143—46.55)

This invention relates to tractor mounted power saws and in particular to improved means for mounting the saw and for feeding to it logs that are to be cut.

A primary object of the invention is to provide an improved suspension for a circular wood saw whereby it may be mounted on and driven by a tractor without any special equipment or modifications to the tractor and whereby the saw is mounted between the front and rear wheels of the tractor and parallel to the frame of the tractor in such a manner that it is protected from injury while the tractor is being driven from one place to another.

Another object of the invention is to provide improved means for feeding logs to the saw in a direction at right angles to and beneath the frame of the tractor between the front and rear wheels thereof, the said feeding means being driven from a standard power take-off shaft of the tractor.

Still another object is to provide means actuated by the standard hydraulic pump of the tractor for raising and lowering the saw.

Yet another object is to provide a simplified unitary frame that may be easily attached to or removed from the tractor frame and which has mounted thereon both the saw and the log feeding means in such a manner that they do not protrude beyond the rear wheels of the tractor nor to the rear of the tractor and hence do not interfere with the use of the tractor for other purposes while mounted thereon.

Figure 1:
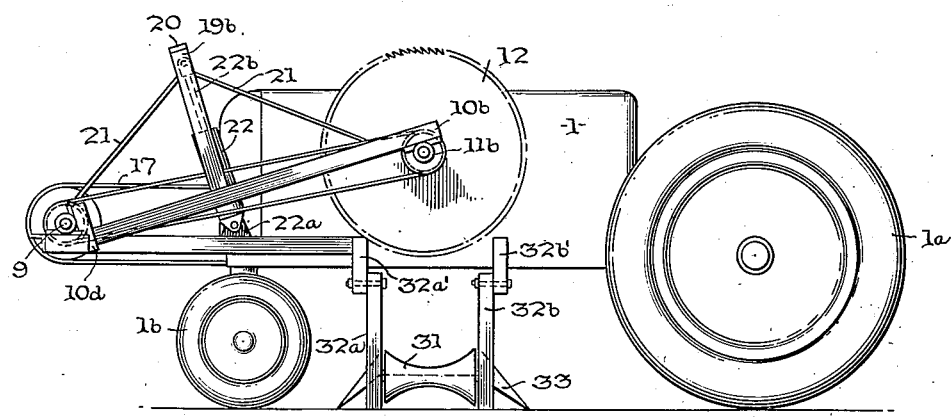
Figure 2:
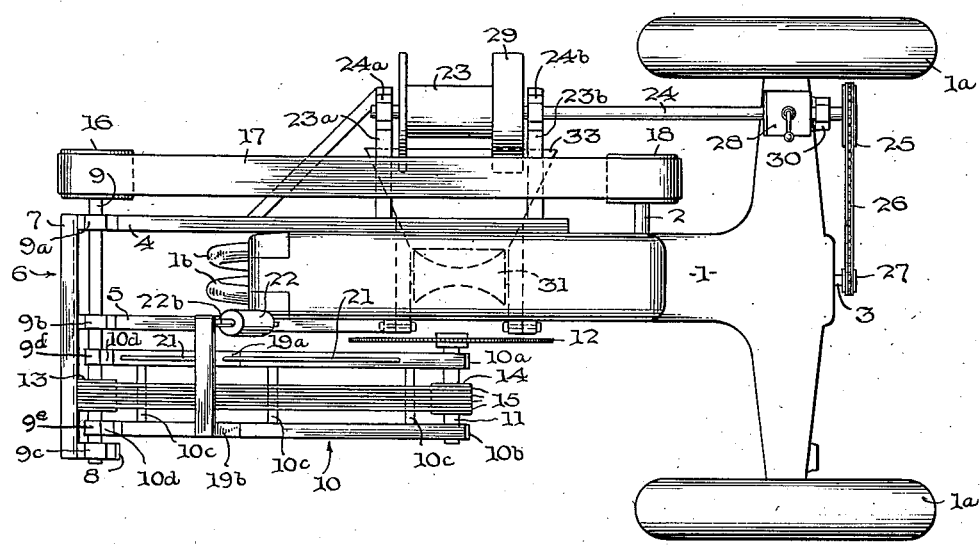

A preferred form of the invention is shown in the accompanying drawing in which:

Figure 1 is side elevational view showing the invention applied to a standard tractor, and Figure 2 is a top plan view of Figure 1.

Referring to the drawing, the invention is shown applied to a standard tractor 1 having a pair of rear traction wheels 1a and a pair of pivotally mounted front wheels 1b. The tractor is also provided with a power take-off shaft 2 on one side and another power take-off shaft 3 at the rear, as well as a hydraulic pump (not shown) which is usually included in the accessory group at the rear of the tractor, this group also including shaft 3. The arms 4 and 5 of a U-shaped frame 6 are attached to opposite sides of the tractor frame. The crossbar 7 which connects the two arms 4 and 5 extends beyond arm 5 and carries a stub arm 8. A countershaft 9 is mounted on frame 6 parallel to crossbar 7 and is free to rotate in bearings 9a, 9b. 9c carried by arms 4, 5 and 8.

A swinging arm 10 comprising two side members 10a and 10b connected by cross members 10c and having stub members 10d mounted on one end of members 10a and 10b and at right angles thereto is pivotally mounted on shaft 9 by means of bearings 9d and 9e carried by stub members 10d and positioned between bearings 9b and 9c. The other end of arm 10 carries shaft 11 which is journaled in bearings 11a and 11b mounted on the members 10a and 10b near the free ends thereof. A circular saw 12 is mounted on the inner end of shaft 11.

Mounted between members 10a and 10b on shafts 9 and 11, respectively, are pulleys 13 and 14 which are connected by belts 15, preferably V-belts. At the other end of shaft 9 is mounted pulley 16 which is connected by belt 17 to pulley 18 mounted on power take-off shaft 2.

Intermediate the ends of arm 10 are uprights 19a and 19b connected at the top by cross bar 20 which extends to one side and over arm 5 of the U-shaped mounting frame. The upright 19a may be braced by a couple of tie-rods 21 secured to the top end of the upright and anchored to the ends of arm member 10a. A hydraulic cylinder 22 extends between the overhanging end of cross bar 20 and the frame arm 5 and is pivotally attached to arm 5 at 22a. The connecting rod 22b extending out of the upper end of cylinder 22 is pivotally connected to the overhanging end of cross bar 20, whereby reciprocation of the piston in the cylinder 22 will raise and lower the saw-supporting arm 10. The cylinder 22 is actuated by pressure from the hydraulic pump provided as standard equipment on the tractor in order to raise and lower the saw 12. A control valve is provided near the operator's seat on the tractor for controlling the fluid supplied from the pump to the cylinder 22.

The arrangement for drawing in logs to be sawed and for moving them into proper position to be sawed includes a winch 23 arranged on the opposite side of the tractor from the saw and being rotatably mounted on a shaft 24 which in turn is rotatably mounted in bearings 24a, 24b carried by a pair of laterally extending brackets 23a and 23b secured to frame arm 4. Shaft 24 is parallel to arm 4 and extends to the rear of the tractor where it is connected to the rear power take-off shaft 3 by suitable means such as the sprocket 25 mounted on shaft 24, chain 26, and sprocket 27 mounted on shaft 3. A suitable change-speed gearing 28 may be interposed in the drive for the winch if desired. The winch 23 is releasably connected to shaft 24 through clutch 29 which may be operated by suitable controls placed within reach of the operator's position. When the clutch is disengaged the winch 23 is free to rotate on shaft 24 so the cable on the winch may be pulled out and attached to a log to be pulled in. The shaft 24 when gearing 28 is not provided may be supported at its rear end by a bearing 30 which is bolted to one of the several mounting pads usually provided on the rear axle housing of the tractor.

The winch is used to drag logs to the tractor from inaccessable places, such as from swampy places. The winch is also used to pull the log into proper position to be sawed, that is, the log is pulled into position beneath the tractor where the front end of the log is guided into position and is supported during the sawing operation by a ramp embodying a roller 31. This roller is journaled on a shaft mounted between two inclined arms 32a and 32b which form the frame of the ramp and which are pivotally attached at their upper ends to the tractor frame in order that the ramp may be swung up and out of the way when it is desired to move the tractor. For example, arms 32a and 32b may be pivoted to brackets 32a' and 32b' which are rigidly secured either directly to the tractor frame or to the saw frame member 5. The roller 31 has a smaller diameter at its mid-point than at each end in order more effectively to hold the log in position, and a ramp floor 33 having diverging side walls is supported on arms 32a and 32b in front of the roller 31 to assist in guiding the log onto the roller. It will be noted that the ramp, including roller 31, is positioned beneath the tractor and in a position to locate the log directly below the saw in its operating position.

The operation of the saw is believed to be clear from the foregoing description. In the normal position of the saw as shown in Figure 1, the lower end of cylinder 22 is connected to the fluid supply or pump and the saw is held in its upper position. When a log is brought into sawing position on roller 31, the valve controlling the cylinder is shifted to connect the upper end of the cylinder to the fluid pump and the lower end to the return pipe. The speed of lowering the saw is controlled by throttling the control valve. When the saw is to be raised, the control valve is operated to reverse the connections to the two ends of the cylinder. The cylinder 22 may be of the single acting type normally holding the saw in raised position, and when the saw is to be lowered the connection to the lower end of the cylinder is shifted from the pump to the return pipe and, by properly throttling the return of the fluid from the cylinder, the saw may be lowered gradually by gravity into sawing position. The saw supporting arm may be counter-weighted or provided with a suitable biasing spring for normally holding the saw in raised position, and the cylinder 22 would then be used to lower the saw into sawing position by connecting the upper end of the cylinder to the fluid supply. The use of a fluid operated piston for controlling the movement of the saw from a raised position to a lowered position provides an easily controlled arrangement for moving the saw without danger to the operator.

What is claimed is:

1. A power saw arrangement mounted on and driven by a tractor having a power take-off shaft on one side thereof, said arrangement comprising a generally U-shaped frame mounted across the front of said tractor, the arms of said frame being attached to opposite sides of the frame of said tractor, a counter-shaft mounted for rotation on the yoke portion of said U-shaped frame at right angles to said arms, said counter-shaft extending across the front of said tractor forward of the front axle thereof, a swinging arm positioned on the opposite side of said tractor from said take-off shaft and its forward end pivotally mounted on said counter-shaft and its rear end extending to a point substantially mid-way between the front and rear wheels of said tractor, a second shaft mounted parallel to said counter-shaft in bearings at the free end of said swinging arm, a circular saw mounted on said second shaft, driving means operatively connecting said counter-shaft and said second shaft, driving means operatively connecting said counter-shaft and said power take-off shaft, and actuating means connecting said swinging arm and one arm of said U-shaped frame for swinging said swinging arm about said counter-shaft to raise and lower said saw.

2. A power saw arrangement according to claim 1 and including a winch mounted on the frame of said tractor on the opposite side thereof from said saw with its rotary axis arranged parallel with the fore-and-aft axis of said tractor, whereby said winch may be used to draw logs into sawing position beneath said saw from positions displaced to one side of said tractor, and releasable clutch means for driving said winch from said tractor.

3. A power saw arrangement according to claim 2 and including a log supporting ramp pivotally supported at one end on the side of said tractor adjacent said saw and having its free end resting upon the ground on the opposite side of said tractor, said ramp being movable into a raised position out of contact with the ground.

4. A power saw arrangement mounted on and driven by a tractor having a power take-off shaft extending laterally from one side thereof at a point between the front and rear axles of said tractor, said arrangement comprising a counter-shaft mounted upon said tractor across the front end thereof and forward of the front axles of said tractor, means for driving said counter-shaft from said take-off shaft, a saw supporting arm arranged on the opposite side of said tractor from said take-off shaft and having the front end thereof pivotally mounted on said counter-shaft and its rear end extending to a point substantially mid-way between the front and rear wheels of said tractor, a circular saw rotatably mounted on the free end of said arm with its plane arranged parallel with the fore and aft axis of said tractor, means for driving said saw from said counter-shaft, a log supporting ramp arranged beneath said tractor adjacent said saw and having a pair of parallel supporting arms pivotally attached at their upper ends to said tractor on the side adjacent said saw and having their lower ends resting on the ground on the opposite side of said tractor, and actuating means connected to said swinging arm for swinging said arm about said counter-shaft to raise and lower said saw with respect to said ramp.

5. A power saw arrangement according to claim 4 and including a winch mounted on said tractor above said ramp and on the opposite side of the tractor from said saw with its rotary axis arranged parallel with the fore-and-aft axis of said tractor, whereby said winch may be used to draw logs into sawing position on said ramp, and releasable clutch means for driving said winch from said tractor.

6. A power saw arrangement according to claim 4 and including means for normally holding said saw supporting arm in a raised position, and a tractor-operated power device for controlling movement of said arm to a lower position.

7. A power saw arrangement mounted upon a tractor comprising a circular saw mounted at one side of said tractor between the front and rear wheels thereof with its plane arranged parallel with the fore-and-aft axis of said tractor, means for raising and lowering said saw, a log supporting ramp arranged beneath said tractor adjacent said saw and having a pair of parallel supporting arms pivotally attached at their upper ends to said tractor on the side thereof adjacent said saw and having their other ends resting on the ground on the opposite side of said tractor, and a winch mounted on the opposite side of said tractor from said saw and above said ramp with its rotary axis arranged parallel with the fore-and-aft axis of said tractor, whereby said winch may be used to draw logs into sawing position on said ramp.

8. A power saw arrangement mounted on and driven by a tractor having a power take-off pulley mounted on a shaft extending laterally from one side of the tractor, said arrangement comprising a generally U-shaped frame mounted across the front of said tractor, the arms of said frame being attached to opposite sides of the frame of said tractor, a counter-shaft mounted for rotation on the yoke portion of said U-shaped frame at right angles to said arms and at a location forward of the front axle of said tractor, a pulley mounted on said counter-shaft in alignment with said take-off pulley, a driving belt connecting said pulleys, a swinging arm positioned on the opposite side of said tractor from said take-off pulley and being formed of two laterally spaced, parallel members having their forward ends pivotally mounted on said counter-shaft, and their rear ends extending to a point substantially mid-way between the front and rear wheels of said tractor, a second shaft mounted parallel to said counter-shaft in bearings at the free ends of said parallel members and extending inwardly beyond the inner parallel member, a circular saw mounted on the inner end of said second shaft, a driven pulley mounted on said second shaft between said parallel members, a driving pulley mounted on said counter-shaft in alignment with said driven pulley, a belt connecting said driving and driven pulleys, and means connected to one of said parallel members for swinging said swinging arms about said counter-shaft to raise and lower said saw.

WILLIAM ALBERT DENNIS.

REFERENCES CITED

The following references are of record in the file of this patent:

UNITED STATES PATENTS

| Number | Name | Date |
|---|---|---|
| 374,573 | Beghtel | Dec. 13, 1887 |
| 742,223 | Patterson | Oct. 27, 1903 |
| 1,547,360 | Byrd | July 28, 1925 |
| 1,835,376 | Cherney | Dec. 8, 1931 |
| 2,310,152 | Ronning | Feb. 2, 1943 |